United States Patent [19]
Barg, Jr.

[11] 3,892,841
[45] July 1, 1975

[54] ENHANCING THE VISIBILITY OF IMMUNODIFFUSION PRECIPITIN BANDS IN HUMAN PLACENTAL LACTOGEN TEST

[75] Inventor: William Frederick Barg, Jr., Monsey, N.Y.

[73] Assignee: American Cyanamid Company, Stamford, Conn.

[22] Filed: July 11, 1973

[21] Appl. No.: 378,352

[52] U.S. Cl. .................... 424/12; 23/230 B; 424/8; 424/13
[51] Int. Cl. ..................... G01n 31/02; G01n 33/16
[58] Field of Search .......................... 424/8, 12, 13

[56] References Cited
OTHER PUBLICATIONS

Seppala, Acta, Obstet. Gynec. Scand. Vol. 49, 1970, pp. 143–147.
Russell, J. Tech. Methods & Bull. (Int. Asso. Med. Museums), Vol. 21, 1941, pp. 47–49.
Alpert, The Lancet, May 23, 1970, pg. 1120.
Bergrahm, Nature, Vol. 185, Jan. 23, 1960, pp. 242–243.
Neurath, The Proteins, Vol. 2, Acd. Press, N.Y., 1964, pp. 265–276.

*Primary Examiner*—Albert T. Meyers
*Assistant Examiner*—A. P. Fagelson
*Attorney, Agent, or Firm*—Jack W. Richards

[57] ABSTRACT

An improved method for the immunochemical determination of human placental lactogen in the serum or plasma of pregnant humans involving a radial immunodiffusion technique using an aqueous solution of the soluble metal salts of zinc and copper to enhance the visibility of immunodiffusion precipitin bands. The method can be used to determine fetal status by measuring the function of the placenta.

4 Claims, No Drawings

ENHANCING THE VISIBILITY OF IMMUNODIFFUSION PRECIPITIN BANDS IN HUMAN PLACENTAL LACTOGEN TEST

BACKGROUND OF THE INVENTION

This invention is concerned with an improved method for the quantitative determination of human placental lactogen in the serum or plasma of pregnant women involving a radial immunodiffusion technique using an aqueous solution of the soluble metal salts of zinc and copper to enhance the visibility of immunodiffusion precipitin bands.

The occurrence and preparation of a human placental lactogenic factor or principle (HPL) is known in the art and is described by Higashi, Endocrinol, Jap. 8: 288, 1961; Higashi, Endocrinol, Jap., 9: 1, 1962; and Josimovich and MacLaren, Endocrinol., 71: 209, 1962. An improved method for obtaining and purifying human placental lactogen is described in U.S. Pat. No. 3,409,605.

At the present time there is evidence that serum placental lactogen levels are an index of placental function and thus fetal status. The value of serial measurements of HPL during gestation as an index of placental function has been studied and confirmed by a number of investigators in both normal and abnormal pregnancies. Saxena BN, Emerson K, and Selenkow HA, New England J. Med. 281:225, 1969; Seppala M, and Ruoslahti E, Acta Obstet. Gynec. Scand. 49: 143, 1970; Singer W. Desjardins P. and Friesen HG, Obstetrics and Gynecology 36: 222, 1970; Spona J. and Janisch H, Acta Endocrin. 68: 401, 1971; and Varma K. Driscoll SG, Emerson K et al., J. Ob. Gyn. 38: 487, 1971. A general consensus has been that abnormally low levels of HPL from the 30th week of gestation to term are diagnostic of placental insuffiency caused by a number of conditions including maternal hypertension and toxemia.

The placental function test disclosed herein is designed primarily for serial determination of the blood level of HPL in pregnant women from the second trimester to parturition and permits the assessment of placental function and thus indirectly, fetal health. The level of hormone HPL in pregnant females varies in different individuals and rises as gestation progresses. The hormone HPL is produced by the placenta in increasing amounts throughout pregnancy, with blood levels rising from 2 $\mu$g./ml. to approximately 12 $\mu$g./ml. from the 4th to the 9th month. Failure of the level to rise, or a falling level, indicates possible danger to the fetus because of conditions such as toxemia.

Immunodiffusion as a technique has aroused substantial interest for its possible application as a diagnostic and analytical tool. Briefly, immunodiffusion involves reaction, e.g., between an antigen and an antibody, effected in semisolid media, commonly agar or agarose gel. Both reactants are initially soluble in the carrier, but the reaction product (or complex) is insoluble and may be observed visually or photographically. For further background on immunodiffusion, reference is made to the widespread literature on this subject some of which is listed in the bibliography of the text entitled "Immunodiffusion", A.J. Crowle, Academic Press, New York (1961).

Among the various immunochemical precipitin methods employing diffusion in agar gels, the technique of single radial immunodiffusion used in the method of this invention has been the least studied. Briefly, the single radial diffusion type precipitin reaction is performed by incorporating one of the two partners of the reaction, usually the antibody, into the agar gel, at a uniform concentration, whereas the other reactant, usually the antigen, is introduced into a well from which it is allowed to diffuse into the gel wherein it will react with the reactant in the gel to form a precipitin ring. The term radial immunodiffusion is applied to systems in which the gel is spread out on a surface (hereafter, referred to as the immunodiffusion plate), with diffusion taking place radially, starting from a circular well.

Mancini, et al. reports on an immunochemical quantitation of antigens by single radial immunodiffusion, Immunochemistry, Vol. 2, No. 1, pp. 235–254 (1965). Here an unknown amount of antigen is allowed to diffuse radially from a well in a uniformly thin layer of antibody-containing agar for a sufficient time to allow all antigen to combine, the final area reached by the precipitin is directly proportional to the amount of antigen employed, and inversely proportional to the concentration of antibody. Mancini, et al., supra, report that by standardizing the technical conditions of the experiment it is possible to use this principle for the immunochemical determination of antigens. Fahey, et al. discloses the quantitative determination of serum immunoglobulin in immunodiffusion plates using the technique of Mancini, et al. The Journal of Immunology, Vol. 94, No. 1, pp. 84–90 (1965).

Seppälä, et al. specifically disclose a method for determination of human placental lactogen hormone (HPL) concentration using the single radial immunodiffusion technique of Mancini, et al., supra. Acta Obstet.Gynec Scand, 49: 143–147 (1970). Seppälä, et al., supra, conclude that the single radial immunodiffusion method is a simple and reliable technique for the measurement of serum proteins. However, for clinical use, Seppälä, et al., supra, note that the weakness of the method is that the results cannot be recorded for 48 hours. Another problem involved in the use of the single radial immunodiffusion technique for determination of HPL concentration is that, occasionally, certain sera or plasma will show a hazy "halo" surrounding the well which makes the precipitin ring difficult to see and measure, especially in cases where the concentration of HPL is low, or the elapse of an extended period of time is necessary before the precipitin ring is visble enought to measure.

It is known to enhance the visibility of immunodiffusion precipitin bands in some antigen:antibody systems by staining with organic dyes, for example, Amido Black (Mancini, et al., supra), with Ponceau S dye, (U.S. Pat. No. 3,390,962), or with the use of the addition of some non-specific coprecipitating agent, such as non-immune serum, Mancini, et al., supra). However methods of staining with organic dyes have disadvantages in that they are time consuming (several days) and, in addition, soluble antigen:antibody complexes, not visible to began with, can be lost during the initial washing procedure.

Crowle, A.J. has reported on the use of certain cations to enhance antigen-antibody aggregation in double diffusion tests, Crowle, A.J., J. Immunol. 81, 194–198, (1958), and Crowle, A.J. Int. Arch. Allergy 16, 113–125 (1960). In Crowle, A.J., Immunodiffusion, Academic Press (1961), pp. 170–172, 194, 228, 256–257, Crowle reports on attempts to enhance precipitin bands with a variety of cations, but of all those tested, only three, i.e., cadmium, nickel and lanthanum were found to enhance antigen-antibody aggregation. Crowle, A.J., in Int. Arch. Allergy, 16: 113–125 (1960), at page 118, reports that of the twenty cations tested, only four, i.e., cadmium, nickel, lanthanum and cerium, where found to enhance double-diffusion precipitin bands. Here, Crowle found that the cations copper and zinc did not enhance precipitin bonds. Crowle, A.J., Int. Arch. Allergy, 16: pp. 118 and 121.

However, none of the Crowle, A.J. publications referred to hereinabove specifically report work with HPL, or with the enhancement of double-diffusion precipitin bands containing antigen-antibody systems containing HPL. Other differences existing between Crowle, A.J.'s reported work and that of the present invention are that Crowle was working with a double-diffusion precipitin test whereas the present invention is concerned with a radial immunodiffusion precipitin test. Crowle's technique involved incorporating the soluble metal salt in the agar whereas the present invention involves an overlay technique, i.e., putting the soluble metal salt on the gel. Crowle's test and that of the present invention are for entirely different purposes. Crowle's test is strictly a qualitative one whereas that of the present invention is a quantative test.

In Immunodiffusion, Academic Press (1961), at page 194, Crowle reports successful work on incorporating water soluble cadmium, nickel, and lanthanum salts in agar gels to increase the sensitivity of immunodiffusion tests. However, it has been found that the use of such salts in the practice of the present invention does not work. It has also been found that the cadmium salt reported by Crowle as the most suitable salt, does not enhance precipitin bands in the method of the present invention. It has now unexpectedly been found, that the cations, copper and zinc, previously reported by Crowle, A.J. in Int. Arch. Allergy, 16 at pages 118 and 121, as not enhancing precipitin bands, do, in fact, enhance such bands in the practice of the method of the present invention.

SUMMARY OF THE INVENTION

The method of the present invention provides a rapid and highly accurate quantative method for the determination and measurement of human placental lactogen (HPL) levels in the serum or plasma of pregnant women. The method is designed to more accurately measure the function of the placenta and thus to more accurately determine fetal status by an assay of the level of human placental lactogen (HPL) obtained from the serum or plasma of pregnant human females. Accurate determination of fetal status can be a life saving factor for both mother and fetus.

It has now been found in the practice of the method of the present invention, that HPL antigen:HPL antibody precipitin bands in a single radial immunodiffusion test for measurement of human placental lactogen (HPL) can be strongly enhanced, and non-precipitating HPL antigen: HPL antibody complexes made to precipitate, by treating appropriately prepared immunodiffusion plates with aqueous solutions of the water soluble metal salts of copper and zinc. Accurately readable results have been obtained in less than 3 hours.

Briefly, the method of the present invention is a method for enhancing the visibility of immunodiffusion precipitin bands in a quantative radial immunodiffusion diagnostic test for measurement of human placental lactogen which comprises the steps of washing an incubated immunodiffusion plate containing HPL antigen:HPL antibody precipitin bands with water, dilute neutral salt solutions or an aqueous solution of tris-(hydroxymethyl)-aminomethane, ammonia, sodium ethylene diaminetetraacetate, or any base that forms soluble complexes or chelates with copper or zinc ions; contacting the washed plate with an aqueous solution of a soluble metal salt wherein the metal is selected from the group consisting of copper and zinc; and rinsing the plate with water or an aqueous solution.

In general, to carry out the method of the present invention, immunodiffusion plates are made up of a gel which can be agar, agarose, or other similar supporting media containing HPL antibody incorporated therein. Best results are obtained in the practice of the present invention if agarose is used to make up the plate. A series of wells are made in the plate by removing portions of the gel. The wells are then filled with sera containing HPL antigen and the plate incubated. After incubating the plate a sufficient time to allow the HPL antibody and the HPL antigen to interact, the resulting precipitin bands are made visible, or are enhanced, by washing the gel with water, dilute neutral salt solutions, or any base that forms soluble complexes or chelates with copper or zinc ions, preferably, with an aqueous solution of a weak base. The washed gel is then treated or placed in contact with an aqueous solution of a soluble copper of zinc salt and finally rinsed with water or other aqueous solutions such as saline.

After washing the HPL immunodiffusion plate, treatment with the aqueous solutions of the copper and zinc salt and rinsing, the precipitin bands are found to be markedly enhanced. The diameter of the band is related to HPL concentration, and the specimen potency is determined by comparing the ring diameter of an unknown with those of standard reference sera in manners known to the art, Mancini et al., supra.

DETAILED DESCRIPTION OF THE INVENTION

The preliminary washing of the immunodiffusion plate after incubation is necessary to remove or reduce the level of substances (phosphates, proteins) that will interfere with the copper or zinc ion enhancing effect. For example, phosphate buffers would cause precipitation of copper phosphates. The preliminary washing can be done with water, about 0.15M neutral aqueous salt solutions or with a 0.002 to 0.10 molar aqueous solution of tris-(hydroxymethyl)-aminomethane, ammonia, sodium, ethylene diaminetetraacetate or any weak aqueous solution of a base that forms soluble complexes or chelates with copper or zinc ions. The preliminary washing of the immunodiffusion plate is preferably done with a weak aqueous solution of tris-(hydroxymethyl)-aminomethane. The concentration of the tris-(hydroxymethyl)-aminomethane can vary from about 0.002 to about 0.10 molar, with a concentration of about 0.01 molar preferred. Good results are obtained by soaking the plates in a 0.01 molar aqueous solution of tris-(hydroxymethyl)-aminomethane without pH adjustment. The preliminary washing of the plate may also be done by immersing the plate in water or in an aqueous isotonic solution of NaCl (about 0.15M), although the results are not as satisfactory as when a weak aqueous solution of a base is used. The use of weak aqueous bases other than tris-(hydroxymethyl)-aminomethane requires adjusting the pH to below 10, preferably about pH 9, with dilute acid, preferably HCl. With pH adjustment, the concentration of the above bases is the same as that for tris-(hydroxymethyl)-aminomethane.

Suitable metal salts which can be used to treat the washed plate, and those which have been found to enhance precipitin bonds, include the water soluble zinc and copper salts such as zinc sulfate, zinc chloride, zinc acetate, copper sulfate, copper chloride, and copper acetate. The preferred salt is cupric chloride. However, since the anion is not involved in the enhancing effect, any water soluble salt of copper or zinc is deemed effective. The concentration of the zinc or copper salt in water solution can range from about 0.01 to about 0.2 w/V percent, with a concentration of 0.04 w/v percent preferred. The washed plate is contacted with about 0.01 to about 0.2 w/v percent aqueous solution of the water soluble copper or zinc salt, preferably 0.04 w/v percent.

The final rinsing of the plate, after treatment with the aqueous solution of the metal salt, is accomplished with water or weak salt solutions such as 1 percent NaCl or with any aqueous solution that will remove excess metal salts.

For use with HPL immunodiffusion plates, good results have been obtained by soaking agarose plates for two hours in an aqueous solution 0.01M tris-(hydroxymethyl)-aminomethane dissolved in water without pH adjustment. The plates were then removed from the tris-(hydroxymethyl)aminomethane solution and submerged in an aqueous solution of cupric chloride ($CuCl_2 \cdot 2H_2O$, 0.4 mg./ml.) for about 30 minutes. After rinsing in water for about 10 minutes the precipitin bands were seen to be strongly enhanced and readily recordable. Equally as good results were also obtained by adjusting the pH of the copper solution with tris-(hydroxymethyl)-aminomethane or any of the other bases mentioned herein. It has been found that with increasing pH the time of contact of the plate with the copper solution must be increased to obtain maximal results. Copper enhancement has been found using copper salt solutions adjusted to from about pH 5 to pH 7.5, and, the effective pH range of enhancement for both copper and zinc salts is considered to be between about pH 5 to about pH 7.5.

In carrying out the HPL test, HPL can be measured by means of a quantative radial immunodiffusion assay, performed by modification of the method of Mancini, et al., Protides of the Biological Fluids — 1963, Proceedings of the Eleventh Colloquim, Amsterdam, 1964, Elsevier Publishing Co., pp. 370–373. Such modification includes using agarose, instead of agar, and different buffer additives such as BSA. In any case, the essential procedure used by Mancini, et al., can be used, but modified, as above, to obtain optimum results with a HPL antigen:HPL antibody system. Wells are punched in the agarose containing HPL antibody. The wells are filled with a pregnant woman's serum or plasma containing HPL and with control serum containing known amounts of HPL and the immunodiffusion plates incubated for about 16 to 20 hours at ambient temperature in a humidified container to form precipitin bands. HPL antigen diffuses from the wells into the agarose and reacts with HPL antibody in the agarose to form a precipitin ring.

After incubation, the HPL immunodiffusion plate is washed, treated with the aqueous solution of copper or zinc salt and rinsed to enhance the precipitin ring. The amount of HPL in the specimen is determined by comparing the ring diameter obtained with that of the standard reference sera.

The preferred immunodiffusion plates used to detect HPL consist of a thin layer of agarose gel containing diluted goat antisera (HPL antibody) to HPL antigen. The layer of agarose gel contains uniformly distributed wells (about 3 mm diameter) that are filled with the solutions, i.e., pregnant human serum or plasma and standards, containing various concentrations of HPL antigen. After the wells are filled, the plates are incubated at room temperature for about 20 hours at which time the immuno-precipitin rings are discernible due to the antigen (HPL) diffusing into the antibody (anti-HPL) until it has reached its equivalence point. At the equivalence point the antigen:antibody complex is least soluble and if in high enough concentration a precipitate (precipitin ring) is visible to the naked eye. At the low level of HPL found in most sera from pregnant women, the complex either does not precipitate or is so faint that the diameter of the precipitin ring cannot be accurately measured.

It has been discovered that if the filled and incubated plates are treated with aqueous solutions of copper or zinc salts, precipitin rings that are faint become readily visible. In addition, those sera or plasma from pregnant women with very low levels of HPL (less than 3 $\mu$g/ml.) that do not show precipitin rings before metal salt treatment may do so after development with copper or zinc salts.

The antiserum containing HPL antibody and reference sera used in the test are processed and tested by standard serological techniques. The human placental lactogen used in the HPL test as reference sera can be prepared according to U.S. Pat. No. 3,409,605, and it can be further purified by gel filtration chromatography on Sephadex G-75. In order to prepare anti-HPL serum (HPL antibody) purified HPL antigen can be emulsified with complete Freund's adjuvant at a concentration of 1 mg. per ml. and injected intradermally at multiple sites in rabbits three times at weekly intervals. Two weeks after the third injection a booster injection of 0.5 mg. of HPL antigen in 0.5 ml. of saline is given by the intra-peritoneal route. After determining the titer of anti-HPL in each rabbit, the animals are bled out and the anti-HPL serum collected and pooled. Pooled anti-HPL serum is emulsified with DuPont Freon 115 in order to remove turbid lippoproteins, and sodium azide at 0.1 percent concentration added as a preservative. Another source of anti-HPL serum is that produced in goats wherein plasma is collected weekly by plasmapheresis. Here anti-HPL serum is purified by gel filtration chromatography and emulsified with complete Freund's adjuvant at a concentration of about 2 mg./ml. and injected into goats intramuscularly at multiple sites three times in about two-week intervals. Two weeks after the last injection plasma is collected by plasmapheresis at weekly intervals. In order to maintain a high level of HPL antibody, the goats received a booster dose 2 months after the last injection. The plasma collected by plasmapheresis was converted to anti-HPL serum (HPL antibody) by standard procedures and then further processed in a manner similar to that done with rabbit anti-HPL serum noted above.

The invention will be more fully illustrated by the following procedures.

PREPARATION OF HPL IMMUNODIFFUSION PLATES

In general, suitable immunodiffusion plates used in the practice of the present invention to detect HPL consist of a thin layer of agarose gel (about 1.5 mm thick) containing diluted (1:250) goat anti-HPL serum (HPL antibody) obtained as noted above. One suitable composition for the agarose gel containing HPL antibody is 1.2 percent agarose, 0.1 percent bovine serum albumin (BSA), 0.4 percent HPL antibody, 0.1 percent $NaN_3$, 0.58 percent NaCl, 0.0112 M $NaH_2PO_4$, and 0.029 M $Na_2HPO_4$ at pH 7.0.

The following is specifically illustrative of the preparation of suitable immunodiffusion plates.

Materials

1. Sterile phosphate buffered saline (double concentration). Final ionic strength 0.15, pH 7.0 ± 0.01.

| | | |
|---|---|---|
| Solution A: | 0.2 M $NaH_2PO_4$ | |
| Solution B: | 0.2 M $Na_2HPO_4$ | |
| Working Solution: | Solution A-56 ml. | QS to 1 liter; |
| | Solution B-147.5 ml. | add 11.6 g. NaCl and check pH. |
| | Solution is sterilized by autoclaving 15 minutes at 15 lbs. pressure. | |

2. Sterile filtered goat antiserum (HPL antibody)
3. Sea-Kem agarose.
4. Sterile 30 percent BSA.
5. Sodium azide.

Procedure

Agarose Preparation. Sea-Kem agarose prepared double concentration (2.4 percent) in sterile distilled water. 12 g. agarose in 500 ml. $H_2O$ — dissolve by heating in a boiling water bath. Cool and hold at 56°C.

Antiserum Preparation. (Double concentration) 4.0 ml. antiserum, 3.3 ml. 30% BSA, 1.0 g. $NaN_3$ in 492.7 ml. buffer. This solution is brought to 56°C. in a water bath and added to the agarose preparation. (Final concentration:antiserum 1:250, agarose 1.2 percent, BSA and $NaN_3$ 0.1 percent each). 1.2 ml. of this mixture are poured into each plate. Plates are allowed to solidify at least three to four hours at room temperature. A series of holes about 3 mm in diameter are punched in the agarose containing antiserum to receive the pregnant human serum or plasma and the standards.

Preparation of HPL Reference Standards

The following is specifically illustrative of the preparation of HPL reference standards to be used in conjunction with HPL immunodiffusion plates prepared as shown above.

| | |
|---|---|
| Materials | |
| HPL (HPL antigen) | 30 mg. |
| Fresh ammonium bicarbonate, 0.05 M, pH 8. | |
| Ammonium bicarbonate | 0.12 g. |
| Distilled Water | 30 ml. |
| Adjust to pH 8.0 with N NaOH. | |
| Normal male serum (0.1 Na azide) - tested prior to use in HPL test plates and shown to be free of precipitin rings, halos or other adverse reactions. | |

Procedure

A. HPL Stock Solution

The HPL stock solution is made up to contain a protein concentration of 1.0 mg./ml. as follows: 30 mg. HPL are dissolved in 15 ml. ammonium bicarbonate buffer at room temperature. The optical density (O.D.) of the resulting solution is read at 280 m$\mu$ and the $E_{280\,m\mu}^{1\%}$ of 0.85 for HPL is used to calculate the protein concentration: mg./ml. = O.D./0.85

From the value obtained the HPL solution is diluted with ammonium bicarbonate buffer so that the final concentration of protein is 1.0 mg./ml.

B. HPL Standards

1. Preparation of 9 $\mu$g/ml. Standard
   Using a magnetic mixer, 20 ml. of the HPL stock solution are rapidly added to 2,200 ml. of normal male serum at room temperature. The resulting mixture is stirred 15 minutes before preparing the 3 and 6 $\mu$g/ml. standards. A 1,050 ml. aliquot is removed and sterile filtered.
2. Preparation of 6 $\mu$g/ml. Standard
   Of the 9 $\mu$g/ml. standard (not sterile filtered) 700 ml. are added to 350 ml. of normal male serum using a magnetic stirrer. The mixture is stirred for 15 minutes and sterile filtered.
3. Preparation of 3 $\mu$g/ml. Standard
   Of the 9 $\mu$g/ml. standard (not sterile filtered) 350 ml. are added to 700 ml. of normal male serum using a magnetic stirrer. The mixture is stirred for 15 minutes and sterile filtered.

ENHANCEMENT OF HPL ANTIGEN:HPL ANTIBODY COMPLEXES WITH CUPRIC CHLORIDE

In practice, the enhancement by metal salts has been best accomplished by first soaking the filled and incubated plates in a 0.01 M aqueous solution of tris-(hydroxy-methyl)-aminomethane for about two hours to remove interfering salts such as phosphates. After soaking in the tris-(hydroxymethyl)-aminomethane solution, the plates were transferred to an aqueous solution of cupric chloride (0.4 mg./ml. $CuCl_2·2H_2O$) for about 30 minutes. After immersion in the cupric chloride solution, the plates were rinsed with distilled water.

The diameters of the precipitin rings were then read. For example, wells containing HPL concentrations of 3, 6 and 9 $\mu$g/ml. were found to have precipitin diameter in millimeters of 4.68, 5.60 and 6.45 respectively. If the diameters are squared the resulting values (21.9, 31.3 and 41.6) are found to give a straight line when plotted against their respective HPL concentrations (3, 6 and 9 $\mu$g/ml.). The HPL concentration of serum from a pregnant woman is found by squaring the diameter of its precipitin ring and using the above plot as a standard curve.

Analysis of the serum from 36 pregnant woman for HPL levels by radial immunodiffusion was done by the method outlined above. All 36 sera showed HPL precipitin rings after copper salt immersion. Prior to copper salt immersion 8 of the 36 sera failed to show precipitin rings. In addition, the 28 sera run in duplicate and measured prior to copper salt immersion, showed greater variation in ring diameters than when measured after copper treatment. Therefore, the method outlined herein for enhancement of precipitin ring formation, in addition to detecting HPL in all samples tested, was also more precise. Results with the enhancement technique of this invention also demonstrated that the HPL concentration detected (1.3 to 5.9 $\mu$g/ml.) in the 36 sera were almost all below the published results using the radial immunodiffusion assay (Morikawa, et al., Endocrinol. Japan 18, 417 (1972)) wherein the lower limit of detection was greater than 5 $\mu$g/ml.

ENHANCEMENT ASPECT IN KIT FORM

A typical placental function test kit capable of carrying out the metal salt enhancement aspect of this invention can be illustrated as follows:

One Placental Function Test Kit containing*
6 - HPL Human Placental Lactogen Plates
1 - HPL Reference Serum I, 0.5 ml.
1 - HPL Reference Serum II, 0.5 ml.
1 - HPL Reference Serum III, 0.5 ml.
2 - $CuCl_2$-$2H_2O$, 300 mg. per vial
2 - Tris buffer, [tris-(hydroxymethyl)-aminomethane] 1.2 g. per package
60 Disposable Capillary Pipettes
Immunodiffusion Measuring Rule

* Plac ♀ Gest, trademark, Lederle Diagnostics, American Cyanamid Company.

Each kit contains six immunodiffusion plates containing antiserum specific for HPL in buffered agarose, one vial of 60 disposable capillary pipettes, two vials containing 300 mg. each of cupric chloride, two packages containing 1.2 g. each of Tris buffer, and three vials containing 0.5 ml. of HPL reference serum with known HPL values shown on the vial labels. Each immunodiffusion plate contains six wells. Three wells are used to prepare a standard curve using the reference sera supplied in the kit, and three wells are for patient specimens. When additional plates are to be used simultaneously, one reference serum is required for each plate. Thus, 18 to 28 determinations may be performed with each kit.

The HPL is measured by means of quantative radial immunodiffusion assay, performed by a modification of the method of Mancini et al. The hormone diffuses from the well into the agar and reacts with its specific antibody to form a precipitin ring. The diameter of this ring is related to the antigenic concentration. The HPL concentration is determined by comparing the ring diameter of the unknown with those of the three standard reference sera. Determinations should be made at monthly intervals during gestation from the 20th week on in order to determine the individual pattern of normal rise in HPL levels.

Directions for Use

1. Remove the immunodiffusion plate from the plastic bag. Remove the plate cover. If moisture is present on the agarose surface, allow the plate to remain at room temperature for 15 to 20 minutes.

2. Transfer samples of reference and patient's sera using the capillary pipettes to the appropriate wells. Fill the wells, using the rubber bulbs or fingertip pressure to control the flow. Take care not to overfill wells; overfilling will cause distortion of the precipitin rings. Fill three wells with the three reference sera (3, 6 and 9 $\mu$g per ml.) using a separate well for each. Use one well for each unknown serum specimen. Additional plates incubated at the same time should have at least one reference standard included.

3. Replace the cover and incubate for 16 to 20 hours at room temperature (20°–25°C). Incubation should be performed on a level surface to avoid formation of distorted precipitin rings, and should be carried out either in a moist chamber or in the plastic bag. The plastic bag may be taped shut after reinsertion of the plate and addition of a few drops of water to provide humidity.

The following visualization procedure is required to bring out the precipitin rings for subsequent quantitation. Dissolve the contents of one of the packages of Tris buffer in one liter of distilled water. The solution is 0.01 M in Tris (1.2 grams per liter). Put approximately 100 ml. in a container, remove the HPL plate lid and immerse the plate in the Tris solution for two hours at room temperature with the plate in a horizontal position.

While the plate is soaking, dilute the contents of one of the vials of cupric chloride with 750 ml. of distilled water. At the conclusions of the two hour immersion of Tris, remove the plate and immerse it in 100 ml. of cupric chloride solution for 30 minutes. Remove the plate and rinse by immersion in 100 ml. of distilled water for 10 minutes. No more than two HPL plates may be used in each 100 ml. portion of visualization reagents.

The precipitin rings will now be clearly visible. Measure the diameter of the precipitin rings. These measurements may be made accurately with the ruled device provided with the kit, or with any other acceptable methods. Measurement is made easier by using a source of light below the plate at an oblique angle. The diameter of each ring should be measured at least twice, preferably at right angles, and the average diameter in millimeters calculated.

5. Prepare a standard curve by
   A. Calculating the square of the precipitin ring diameters in millimeters obtained with the three reference sera,
   B. Plotting on normal arithmetical graph paper the square of diameters ($d^2$) on the horizontal axis and the HPL concentration of the reference sera in $\mu$g per ml. on the vertical axis,
   C. Drawing the straight line of best fit connecting the three points illustrated.

The HPL concentration of unknown specimens is determined by measuring precipitin ring diameters, calculating $d^2$, and determining the concentration of HPL from the standard curve.

When several plates are incubated simultaneously, and only one reference standard is used on the additional plates, the HPL concentration of that standard should be within 10 percent of the value found on the plate used to prepare the complete standard curve.

Maximal accuracy is obtained when the antigen level of the unknown serum specimen is within the range of the three reference sera provided. Abnormally high specimens should be diluted with isotonic saline to reduce the HPL concentration to values within the range of the reference standards. The values obtained must then be multiplied by the dilution factors. The low level of sensitivity with this test is 1.5 $\mu$g HPL per ml. of serum.

6. The level of serum HPL in pregnant females varies in different individuals and rises as gestation progresses to a level of approximately 6 to 8 µg/ml. at term.

Although either serum or plasma may be utilized in the test, serum is preferable. Test specimens may be frozen for assay at later date. Avoid repeated freezing and thawing. Test specimens may be kept at room temperature for up to 24 hours prior to assay with no deleterious effects. Because of the possibility of diurnal variation in HPL levels in women it is recommend that blood be drawn at approximately the same daily time when doing serial determinations on individuals. Solutions of Tris buffer and cupric chloride may be stored at room temperature as long as no visible contamination is observed.

As noted herein, methods other than the use of metal salts have been reported to enhance precipitin ring formation. However, when tested in the HPL anti-HPL system described herein, none of the ingredients or techniques listed below enhanced precipitin ring formation. The methods tested fall into two categories: (1) those where the enhancing agent (additive) was incorporated in the gel and (2) those where the enhancing agent was used by overlaying the gel after incubation. The additives included nonionic polymers (polyethylene glycol, polyvinyl pyrrolidone), increased buffer or salt concentrations (0.5 M NaCl, 0.5 M $(NH_4)_2SO_4$, 0.4 M Na glycinate) and proteins (bovine serum albumin, gamma globulin). Besides soluble metal salts, enhancing agents used in the overlay technique included protein precipitating agents such as tannic acid or acetic acid. Staining with various dyes under various conditions was employed, but staining did not noticeably enhance the HPL antigen:HPL antibody precipitin rings and, moreover such staining required two to four days before a result could be obtained. Crowle, A.J., has suggested ("Immunodiffusion," Academic Press, 1961, p. 172) that barbital buffers may enhance precipitation. But when barbital buffer was substituted for phosphate buffer in the HPL immunodiffusion plate, no differences in the two buffer systems were observed, i.e., the precipitin rings were faint and they were subsequently enhanced by copper salt treatment in both buffer systems.

In "Immunodiffusion," Academic Press, 1961 and J. Immunol. 81, 194–198 (1958), Crowle, A.J. demonstrated enhanced precipitation of antigen-antibody complexes when agar gel was soaked in weak aqueous solutions (0.0125 percent) of the cations cadmium, nickel and lanthanum or when such cations were incorporated in the gel at low concentrations (0.05 percent to 0.0005 percent). However, Crowle, A.J. did not report finding any enhancing effect no matter how incorporated in the gel, with copper or zinc salts, in contrast to the method of this invention. Furthermore, cadmium salts, reported by Crowle, A.J., to give the best enhancing effect, had no effect on the HPL anti-HPL system disclosed herein. The enhancing effect of copper salts and the enhancing effect of cadmium salts would, therefore, appear to be separate and distinct phenomena.

The effect of cadmium, copper and zinc salts, as well as other water soluble metal salts, on their ability to enhance HPL precipitin ring formation is summarized in Table I. For the experiments recorded in Table I, the filled and incubated HPL antigen:HPL antibody immunodiffusion plates, prepared as shown above, were first soaked in a 1 percent water solution of NaCl for 1 to 2 hours, followed by 10 to 30 minute immersion to the metal salt solution and rinsed with distilled water. All metal salts were dissolved in distilled water.

TABLE I

| Metal Salt Tested | Concentration (mg/ml) | pH | Enhancement Effect |
|---|---|---|---|
| $CuCl_2.2H_2O$ | 0.5 | 5.4 | Yes |
| $CuSO_4.5H_2O$ | 0.2 | 4.9 | Yes |
| $CuSO_4.5H_2O$ | 0.5 | 5.0 | Yes |
| $Cu(C_2H_3O_2)_2.H_2O$ | 0.2 | 5.8 | Yes |
| $Cu(C_2H_3O_2)_2.H_2O$ | 0.5 | 5.5 | Yes |
| $Cu(C_2H_3O_2)_2.H_2O$ | 0.5 | 4.1 | Precipitin ring disappeared |
| $ZnSO_4$ | 0.2 | 5.5 | Yes |
| $ZnSO_4$ | 0.5 | 5.9 | Yes |
| $Zn(C_2H_3O_2)_2$ | 0.2 | 5.7 | Yes |
| $Zn(C_2H_3O_2)_2$ | 0.5 | 6.2 | Yes |
| $MgSO_4$ | 0.2 | 5.9 | None |
| $MgSO_4$ | 0.5 | 5.8 | None |
| $Ca(C_2H_3O_2)_2$ | 0.2 | 6.1 | None |
| $Ca(C_2H_3O_2)_2$ | 0.5 | 6.4 | None |
| $Cd(C_2H_3O_2)_2$ | 0.2 | 5.8 | None |
| $Cd(C_2H_3O_2)_2$ | 0.5 | 6.1 | None |
| $Na(C_2H_3O_2)$ | 0.5 | 5.8 | None |
| $Ce(SO_4)_2$ | 0.5 | 2.6 | Precipitin ring disappeared |
| $Al_2(SO_4)_3$ | 0.5 | 4.0 | Precipitin ring disappeared |
| $Fe_2(SO_4)_3$ | 0.5 | 2.7 | Precipitin ring disappeared |

As shown in Table I, copper chloride, copper sulfate, copper acetate, zinc sulfate and zinc acetate all had an enhancing effect on HPL precipitin bands. The results shown in Table I also show that a specific anion is not involved in the enhancing effect. Aqueous solutions of some of the metal salts were acidic. In the latter case, pH values of about 4 or less caused the precipitin rings to disappear. However, it is known that antigen-antibody complexes dissociate in acid.

Copper salts have been incorporated in agarose gel at various concentrations other than using the overlay technique of this invention. However, at a concentration of 0.4 mg./ml. (0.04 percent), copper chloride interfered with the test system because of the precipitation of the antisera contained in the gel. At a concentration (0.1 mg./ml.) where no precipitation occurred, the copper chloride incorporated in the gel had no enhancing effect on precipitin ring formation.

I claim:

1. A method of enhancing the visibility or making visible human placental lactogen antigen: human placental lactogen antibody precipitin bands in an incubated immunodiffusion plate containing same, said plate made up of a gel selected from the group consisting of agar and agarose, which comprises the steps of:
   a. washing said incubated immunodiffusion plate containing said precipitin bands with water, about 0.15 molar neutral aqueous salt solutions, a 0.002 to 0.10 molar aqueous solution of tris-(hydroxymethyl)-aminomethane, a 0.002 to 0.10 molar aqueous solution of ammonia, having a pH of about 9, or a 0.002 to 0.01 molar aqueous solution of sodium ethylene diaminetetraacetate having a pH of about 9;
   b. contacting said washed plate with about 0.01 to about 0.2 w/v percent aqueous solution of a soluble metal salt adjusted to or maintained at a pH of from about 5 to about 7.5, in such a manner to put said soluble metal salt on said gel, wherein the metal is selected from the group consisting of copper and zinc; and c. rinsing said plate with water or saline solution.

2. A method of enhancing the visibility or making visible human placental lactogen antigen:human placental lactogen antibody precipitin bands in an incubated immunodiffusion plate containing same, said plate made up of agarose, which comprises the steps of:
   a. soaking said incubated plate containing said precipitin bands in about 0.01 molar aqueous solution of tris-(hydroxymethyl)-aminomethane;
   b. submerging said soaked plate in about 0.04 w/v percent aqueous solution of cupric chloride adjusted to or maintained at a pH of from about 5 to about 7.5 with tris-(hydroxymethyl)-aminomethane;
   c. rinsing said plate with water.

3. A method for the identification and quantitation of human placental lactogen in the serum or plasma of pregnant women using an incubated immunodiffusion plate containing human placental lactogen antigen:human placental lactogen antibody precipitin bands, said plate made up of a gel selected from the group consisting of agar and agarose, which comprises the steps of:
   a. washing said incubated immunodiffusion plate containing said precipitin bands with water, about 0.15 molar neutral aqueous salt solutions, a 0.002 to 0.10 molar aqueous solution of tris-(hydroxymethyl)-aminomethane, a 0.002 to 0.10 molar aqueous solution of ammonia having a pH of about 9, or a 0.002 to 0.01 molar aqueous solution of sodium ethylene diaminetetraacetate having a pH of about 9;
   b. contacting said washed plate with about 0.01 to about 0.2 w/v percent aqueous solution of a soluble metal salt adjusted to or maintained at a pH of from about 5 to about 7.5 in such a manner to put said soluble metal salt on said gel, wherein the metal is selected from the group consisting of copper and zinc;
   c. rinsing said plate with water or saline solution; and
   d. measuring the diameter of said precipitin bands.

4. A method for the identification and quantitation of human placental lactogen in the serum of pregnant women using an incubated immunodiffusion plate containing human placental lactogen antigen:human placental lactogen antibody precipitin bands, said plate made up of agarose, which comprises the steps of:
   a. soaking said incubated plate containing said precipitin bands in about 0.01 molar aqueous solution of tris-(hydroxymethyl)-aminomethane;
   b. submerging said soaked plate in about 0.04 w/v percent aqueous solution of cupric chloride adjusted to or maintained at a pH of from about 5 to about 7.5 with tris-(hydroxyethyl)-aminomethane;
   c. rinsing said plate with water; and
   d. measuring the diameter of said precipitin bands.

* * * * *